Nov. 22, 1955  C. S. BESSER  2,724,457
ELECTROSTATIC AIR FILTER
Filed Dec. 22, 1953  2 Sheets-Sheet 2

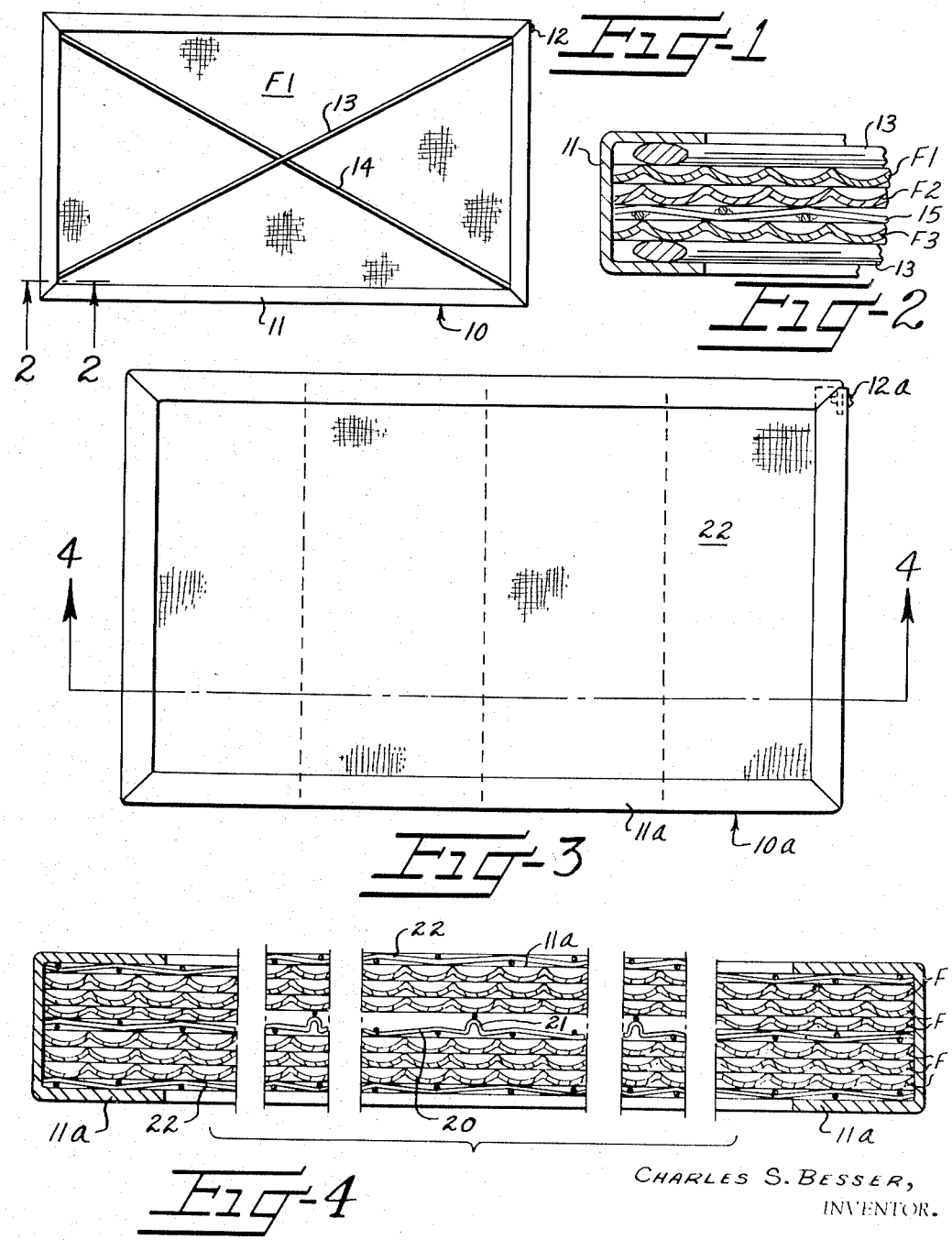

CHARLES S. BESSER,
INVENTOR.

BY Eaton & Bell
ATTORNEYS.

United States Patent Office 2,724,457
Patented Nov. 22, 1955

2,724,457

ELECTROSTATIC AIR FILTER

Charles S. Besser, Charlotte, N. C.

Application December 22, 1953, Serial No. 399,786

4 Claims. (Cl. 183—69)

This invention relates to an improved electrostatic air filter for use in heating and air conditioning systems and the like for trapping fine particles of dust and dirt from the air.

It is an object of this invention to provide an air filter for use in heating or air conditioning systems wherein the filtering material is formed of a loosely woven fabric formed of electrostatic synthetic yarns and whereby the flow of air over said yarns will generate static electricity which will assist in trapping fine particles of dust and dirt in the air flowing through said filter.

It is another object of this invention to provide an air filter of the type described wherein an electrostatic woven fabric is used to filter the air and wherein said fabric is formed from electrostatic synthetic plastic yarns so woven as to provide a plurality of irregularly shaped projections or pockets in said fabric which pockets serve to form air pockets or to disturb the flow of air through the filter so as to cause fine particles of dust and dirt and the like to be trapped by the fabric.

It is another object of this invention to provide an air filter of the type described provided with a frame in which a plurality of sheets of electrostatic plastic woven material are placed and through which the air is adapted to flow and wherein one or more baffles or spacers are placed between some of the sheets of fabric material, said baffles being in the form of screen or the like adapted to separate some of the sheets of fabric to form additional air pockets therebetween.

Heretofore an attempt has been made to use electrostatic material in an air filter but in prior attempts, of which I have knowledge, non-woven fibers have been used and these non-woven fibers have been unsatisfactory in that they cannot be evenly distributed and therefore in a filter of this type the air flow is not even and in many cases is restricted to such an extent that the desired cubic feet per minute flow cannot be obtained. Further, non-woven fibers tend to mat and the filter is difficult or impossible to clean.

One of the advantages of the improved electrostatic woven air filter is that it can be repeatedly cleaned merely by washing the same with cool or warm water and the structure of the filter will not be distributed by such cleaning.

It is another object of this invention to provide an electrostatic woven filter of the type described which will permit maximum air flow and which will not flame if subjected to fire or high temperatures.

Some of the objects of the invention having been stated, other objects will appear as the description proceeds, when taken in connection with the accompanying drawings in which—

Figure 1 is an elevation of one type of air filter made in accordance with this invention;

Figure 2 is an enlarged fragmentary sectional plan view taken along the line 2—2 in Figure 1 and showing the manner in which a plurality of layers of material may be positioned in the filter;

Figure 3 is an elevation of another form of filter made according to this invention;

Figure 4 is an enlarged sectional plan view taken along the line 4—4 in Figure 3 and showing another arrangement of the fabric layers within the filter and also illustrating one type of baffle member;

Figure 6:
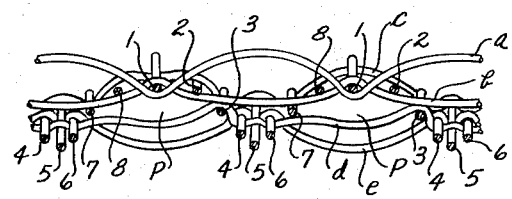
Figure 7:
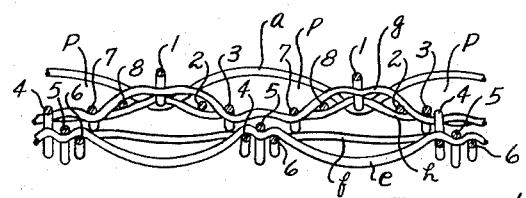
Figure 8:
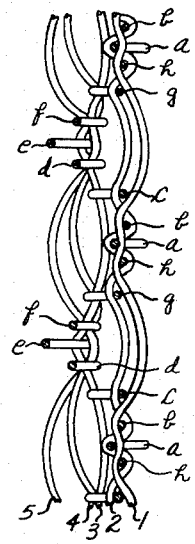
Figure 9:
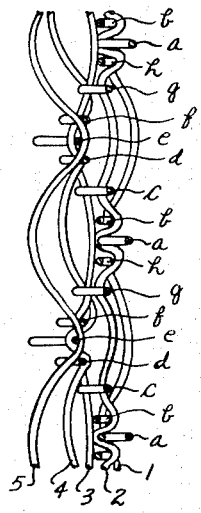
Figure 5:
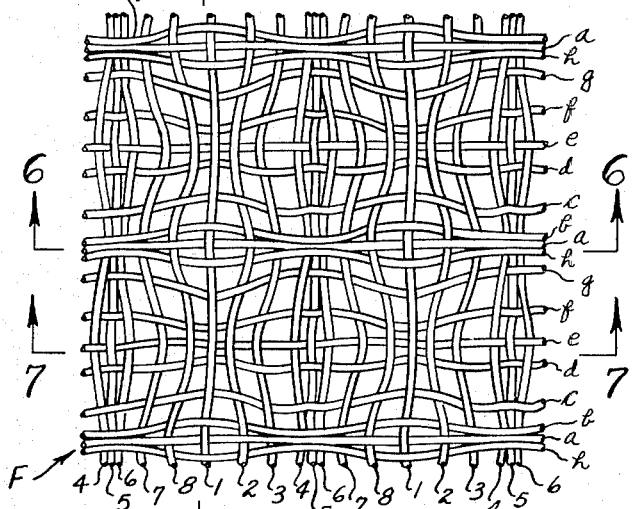
Figure 5 is an enlarged fragmentary elevation of one section of the electrostatic synthetic fabric used in this invention.

Figures 6 and 7 are transverse sectional views through the fabric shown in Figure 5 and being taken respectively along the lines 6—6 and 7—7 in Figure 5;

Figures 8 and 9 are longitudinal sectional views through the fabric taken respectively along the lines 8—8 and 9—9 in Figure 5.

Referring more specifically to the drawings, the numeral 10 broadly designates one type of filter which may be made in accordance with the present invention and which has a frame 11 which is U-shaped in cross-section and which is preferably made of metal but which may be made of any suitable material and is preferably a continuous channel member bent into the form of a rectangular frame and having its ends secured together by any suitable means such as a screw 12. Suitable confining members in the form of diagonally extending rods 13 and 14 are provided on each side of the filter and are confined within the web of the channel frame 11.

Disposed between the pairs of rods 13 and 14 is the filter proper which in the present illustration is shown in the form of three layers of fabric F–1, F–2 and F–3. The layers of fabric F–2 and F–3 are separated by a baffle member or spacer in the form of a screen 15. The layers of fabric F–1, F–2 and F–3 and the screen 15 are rectangular in the present illustration and fit snugly within the confines of the channel frame 11 and are retained therein by the rods 13 and 14.

The fabric utilized in forming the layers F–1, F–2 and F–3 is of novel construction and is formed from a plurality of electrostatic synthetic plastic yarns so woven as to form irregular projections and pockets in the fabric which are designed to disturb the flow of air through the filter to cause precipitation of dust and dirt and the like out of the air and into the filter. The particular structure of this preferred fabric will be described in detail hereinafter, it being understood that any suitable easily woven electrostatic fabric provided with irregular surfaces may be used. The irregular surfaces cause the sheets of fabric to stand apart from each other and provide air space therebetween.

The electrostatic yarns used in forming the filter fabric are preferably vinyl derivatives such as "Saran" or "Vinyon HH." "Saran" is an extruded polyvinylidene yarn, such as is obtained by polymerizing together monomeric vinylidene chloride with one or more other polymerizable materials such as vinyl chloride. "Saran" is preferable as it has the desired electrostatic properties and will not flame but is self extinguishing and will melt rather than burn. It softens at 240° to 280° F. which permits its use in normal heating and air conditioning arrangements where the heated air does not exceed this temperature. Since it will not burn, it presents no fire hazard.

The plastic used should have a certain amount of stiffness and yet be flexible enough to permit the same to be woven in an irregular pattern and wherein the inherent stiffness of the yarn will hold the pattern in its irregular shape. Saran meets these qualifications.

Any number of sheets of fabric may be used in a particular filter, it being noted that where a greater number of sheets of fabric are used a smaller amount of air flow will be obtained and therefore the number of layers used must be varied in accordance with the particular use of the filter and the amount of air which must flow therethrough. In the illustrations of Figures 1 and 2 only three layers of fabric are shown in a relatively small filter.

Referring now to Figures 3 and 4 there will be observed a modified form of filter indicated broadly at 10a. The filter 10a is provided with a frame 11a which is generally U-shaped or channel-shaped in cross section and is preferably continuous and bent into a rectangular shape and has its ends secured together as by a screw 12a. In this illustration six sheets of electrostatic fabric F are confined within the frame 11a, each sheet of fabric being indicated at F.

It will be observed that a baffle 20 is positioned intermediate the sheets of fabric F, there being three sheets of fabric on each side of the baffle 20 and the baffle 20 is preferably formed of foraminated or screen material provided with a plurality of spaced projections or crimps as at 21. The crimps 21 tend to hold the layers of fabric adjacent the baffle apart from each other and cause the fabric F to bow outwardly slightly at the center portion of the air filter.

The baffle 20 permits air flow therethrough like the baffle 15 holds adjacent sheets of fabric F apart to create an air pocket therebetween which causes additional turbulence or disturbance of the air flowing through the filter which serves to precipitate dirt, dust and the like from the air and to further assist in trapping it by the filter.

The layers of fabric F may be confined within the frame 11a by any suitable means such as rods shown in Figure 1 or by means of screen or foraminated material 22 positioned adjacent the outer layers of fabric F and also confined within the frame 11a, the material 22 having sufficient rigidity to hold the fabric F in position. If desired a grid may be used of any desired construction or the rods such as shown at 13 and 14 may run up and down or transversely rather than diagonally.

In a 20" x 25" filter of this type with six layers of electrostatic fabric, an air flow of 1200 C. F. M. is obtained. The number of layers of fabric may be varied in a particular filter in accordance with the air flow desired.

Referring now to Figures 5, 6, 7, 8 and 9 it will be observed that the preferred fabric F is woven to form a plurality of concavo-convex areas of rather loose mesh material. This arrangement is accomplished by utilizing three groups of closely spaced warp yarns and three groups of closely spaced weft yarns at the junctures of each area and the other yarns between the closely spaced juncture yarns are loosely interwoven in such a fashion as to be distended to form the concavo-convex areas. In weaving, the synthetic yarns are sufficiently pliable to permit floating and distension, however, they have sufficient rigidity to maintain the irregularities formed during weaving. If desired, the yarns and/or fabric could be heat formed or set to form and hold the iregularities.

These irregular areas serve as air pockets and which make the woven filter fabric even more effective. Various modifications of weave may be utilized to form irregular pockets in the weave and in the present illustration squares are formed of eight yarns in each direction, the warp yarns being numbered 1 to 8, inclusive, and the weft yarns being numbered a to h, inclusive.

In this illustration it will be observed that in each area the weft yarn a goes under the warp yarn 1 and then is floated over warp yarns 2, 3, 4, 5, 6, 7 and 8 and then under warp yarn 1 of the next area. Weft yarn b is woven over warp yarn 1 and under warp yarn 2 and then is floated over warp yarns 3, 4, 5, 6, and 7 and under warp yarn 8 and again over warp yarn 1 of the next area. Weft yarn c is woven under warp yarn 1, over warp yarn 2 and under warp yarn 3, and is floated over warp yarns 4, 5, and 6 and then is woven under warp yarn 7, over warp yarn 8 and under the next adjacent warp yarn 1.

Weft yarn d is woven under warp yarns 1 and 2, over warp yarn 3, under warp yarn 4, over warp yarn 5, under warp yarn 6 and over warp yarn 7 and under warp yarn 8 and the next adjacent warp yarn 1. The intermediate weft yarn e is woven or floated under warp yarns 1, 2 and 3, over warp yarn 4, under warp yarn 5, over warp yarn 6 and under warp yarns 7, 8 and the next adjacent warp yarn 1.

The pattern is substantially repeated with weft yarn f which is similar to weft yarn d being woven under warp yarns 1 and 2, over warp yarn 3, under warp yarn 4, over warp yarn 5, under warp yarn 6, over warp yarn 7 and under warp yarn 8 and the next adjacent warp yarn 1. The weft yarn g is similar to weft yarn c and is woven under warp yarn 1, over warp yarn 2, floated under warp yarns 3 and 4, over yarns 5 and 6, under yarn 7 and over yarn 8 and under the next adjacent warp yarn 1.

It is noted that the weft yarn g is interwoven with the three yarns 4, 5 and 6 at the juncture of the square while weft yarn c is floated over these yarns. Weft yarn h is similar to weft yarn b and it is woven over warp yarn 1, under warp yarn 2 and is floated over warp yarns 3, 4, 5, 6 and 7 and under warp yarn 8 and over the next adjacent warp yarn 1.

The alternate progressive floating arrangement of the yarns is such as to give the areas a concavo-convex configuration as will be more clearly observed in the sectional views. The synthetic plastic yarn is pliable enough to be woven and upon being woven in this configuration the yarn is distorted from its normal plane and will retain its distorted shape to cause the irregularities or air pockets in the fabric.

It is thus seen that I have provided an improved air filter for use in air conditioning and heating systems or the like and which may also be used in room air conditioners or any other place where air filters of this type may be desirable, and wherein a specially woven electrostatic plastic fabric is utilized as the filtering element and wherein a plurality of layers of said fabric are used to cause air to be trapped therebetween momentarily to precipitate and deposit articles of dust and dirt and the like on the filter and to clean the air passing therethrough. This type of filter permits maximum air flow and can be readily washed to clean the same and will not burn and therefore will pass the underwriter's inspection. The flow of air across or through the loosely woven plastic fabric tends to generate the static electricity which further assists in trapping particles of dirt, dust and the like in the filter.

In the drawings and specification there has been set forth in a preferred embodiment of the invention and, although specific terms are employed, they are used in a generic and descriptive sense only and not for purposes of limitation, the scope of the invention being defined in the claims.

I claim:

1. An air filter comprising a plurality of juxtaposed sheets of loosely woven stiff electrostatic plastic threads, each of said sheets having projections and depressions formed by distentions of some of the plastic threads forming said sheets therein, said projections serving to hold said sheets apart from each other and together with said depressions forming air spaces between said sheets, a corrugated foraminated metal spacer positioned between some of said sheets, and frame means for confining said sheets and said spacer in juxtaposed relation.

2. An air filter comprising a plurality of juxtaposed sheets of loosely woven electrostatic polyvinylidene filaments, some of the filaments forming each of said sheets being floated relative to the other filaments to form projections and depressions in said sheets, said projections serving to hold said sheets apart from each other and together with said depressions forming air spaces between said sheets, at least one corrugated metallic screen spacer between some of said sheets of fabric, and frame means for confining said sheets and said spacer in juxtaposed relation.

3. An air filter comprising a plurality of juxtaposed sheets of loosely woven electrostatic polyvinylidene filaments, each of said sheets having concavo-convex areas formed therein by distention of some of the filaments forming said sheets relative to the other filaments, said concavo-convex areas serving to hold said sheets apart from each other and forming air spaces between said sheets, at least one rigid foraminated spacer positioned between some of said sheets and providing support for all of said sheets, said spacer having a plurality of crimps therein to hold adjacent sheets apart to form an air pocket between said sheets and frame means for confining said sheets in juxtaposed relation.

4. An air filter comprising a plurality of juxtaposed sheets of loosely woven relatively stiff electrostatic polyvinylidene filaments, some of the filaments of each of said sheets being floated with respect to other filaments to form concavo-convex areas in said sheets, said concavo-convex areas serving to hold said sheets apart from each other and forming air spaces between said sheets, at least one spacer positioned between some of said sheets, said spacer being of metallic screen material and having at least one projecting crimp, said crimp serving to hold adjacent sheets of fabric apart and to form an air space therebetween, and frame means for confining said sheets and said spacer in juxtaposed relation.

References Cited in the file of this patent
UNITED STATES PATENTS

| | | |
|---|---|---|
| 2,079,297 | Manning | May 4, 1937 |
| 2,355,822 | Rugeley | Aug. 15, 1944 |
| 2,619,188 | Haw et al. | Nov. 25, 1952 |